United States Patent [19]

Segger

[11] Patent Number: 4,716,488
[45] Date of Patent: Dec. 29, 1987

[54] PRIMARY SWITCHED-MODE POWER SUPPLY UNIT

[75] Inventor: Bernd Segger, Erlangen, Fed. Rep. of Germany

[73] Assignee: Siemens Aktiengesellschaft, Berlin and Munich, Fed. Rep. of Germany

[21] Appl. No.: 855,535

[22] Filed: Apr. 23, 1986

[30] Foreign Application Priority Data

May 23, 1985 [DE] Fed. Rep. of Germany ....... 3518621

[51] Int. Cl.$^4$ .............................................. H02H 9/04
[52] U.S. Cl. ......................................... 361/88; 361/93; 361/104; 363/53; 363/56; 323/278
[58] Field of Search ....................... 361/18, 88, 91, 92, 361/93, 86, 103, 104; 363/53, 56; 323/271, 272, 282, 284, 278, 286, 279, 280; 307/151

[56] References Cited

U.S. PATENT DOCUMENTS

| | | | |
|---|---|---|---|
| 3,733,519 | 5/1973 | Griffey | 361/91 |
| 3,816,809 | 6/1974 | Kuster | 363/56 X |
| 4,063,302 | 12/1977 | Donig | 361/91 |
| 4,447,841 | 5/1984 | Kent | 361/18 |

FOREIGN PATENT DOCUMENTS 0111365  6/1984  European Pat. Off. .
2724358 11/1978  Fed. Rep. of Germany .
57-94819  6/1982  Japan .................................. 323/278
1136136  7/1983  U.S.S.R. .............................. 323/278

Primary Examiner—J. R. Scott
Assistant Examiner—H. L. William
Attorney, Agent, or Firm—Adel A. Ahmed; Jack R. Penrod

[57] ABSTRACT

The invention concerns a primary switched-mode power supply device with several electrically isolated secondary circuits, the output voltage of the secondary circuit being connected to an actual-value sensor with a regulator connected to the sensor output, with the output voltage being protected by a fuse connected in series with the filter capacitor. In accordance with the invention, the junction point of the filter capacitor and the fuse is connectable by an electrically controlled switch to the output terminal of the actual-value sensor as soon as the switch is turned on after the fuse has been tripped. Thus, a simple embodiment of an over-voltage protection is obtained for a primary switched-mode power supply unit with several electrically isolated secondary circuits, without additional monitoring of an in-phase output voltages $A_2$ and $A_3$ and a controlled secondary circuit being controlled in case of a fault to an output voltage that is lower than the normal operating controlled output voltage $A_1$.

4 Claims, 1 Drawing Figure

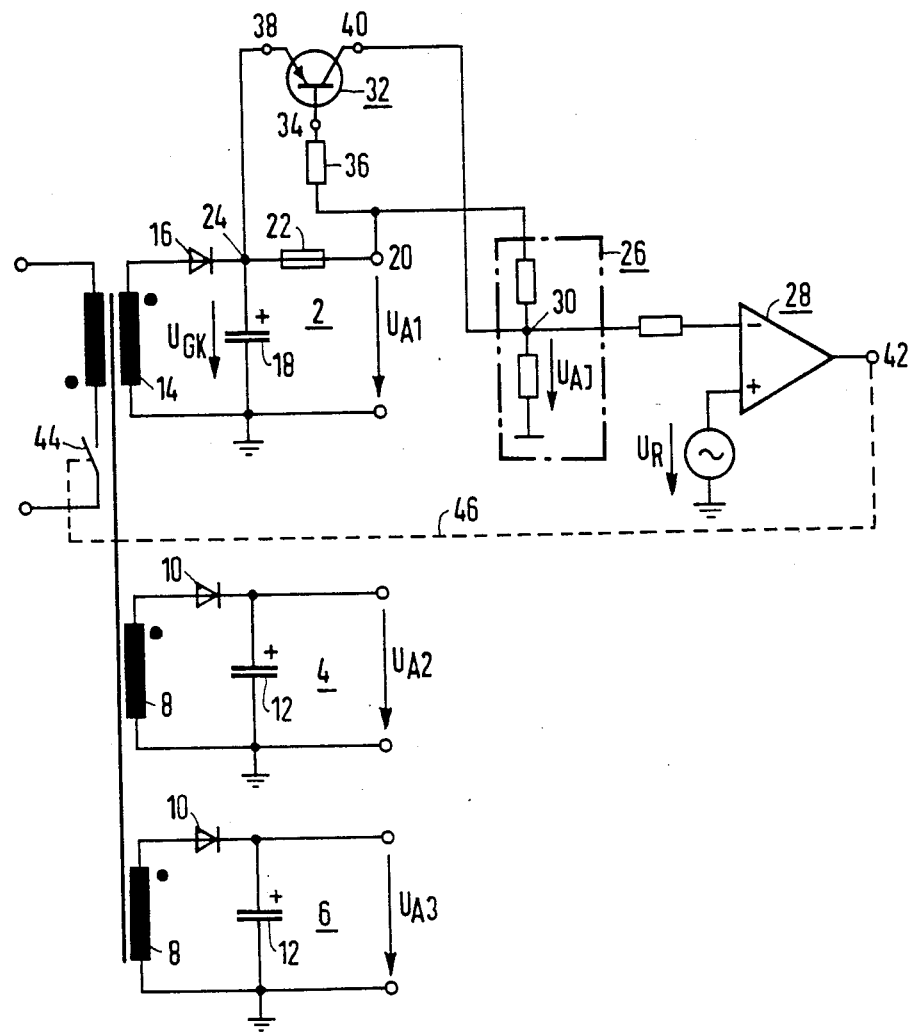

PRIMARY SWITCHED-MODE POWER SUPPLY UNIT

FIELD OF THE INVENTION

The invention relates to primary switched mode power supply units with multiple isolated secondary windings, and more particularly ones having a power switching device connected in series with the primary winding which is controlled by a switching circuit connected to one of the multiple electrically isolated secondary windings.

BACKGROUND OF THE INVENTION

In a commercially available primary switched-mode power supply unit, at least one other secondary winding is provided with a voltage monitoring device which, upon actuation of a protection device such as a fuse connected with the switched-mode power supply providing the primary power switching device with control, a regulator is influenced to lower the duty cycle of the primary switched-mode power supply. Without this voltage monitoring device, the coupled voltages of the secondary windings would increase to impermissively high values as a result of undesirable regulation, and consequential damage would occur in the circuits supplied from these windings.

SUMMARY OF THE INVENTION

It is an object of this invention to provide a primary switched-mode power supply unit having a transformer with several electrically isolated windings in which over-voltage protection is achieved by simple means without the use of voltage monitoring devices as in the known circuits.

Briefly stated in accordance with one aspect of the invention, the aforementioned object is achieved by providing a primary switched-mode power supply unit with a plurality of electrically isolated secondary circuits, each of said secondary circuits having a secondary winding connected to a respective series circuit of a rectifier and a filter capacitor, one of said series circuits having a fuse connected between the connection point of said rectifier and said filter capacitor, and an output of the respective secondary circuit, and said output is connected to a controller. The switched-mode power supply unit also comprises a switch connected from the connection point of the filter capacitor and the fuse to an output terminal of the actual-value sensor.

In another aspect of the invention, the actual-value sensor is a voltage divider connected between the positive output voltage and the output return. In yet a further aspect of the invention, the switch connecting the filter capacitor and the connection point of the actual-value sensor output is a bipolar transistor.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying drawing in which the figure is a schematic diagram of a primary switched-mode power supply unit with several electrically isolated secondary circuits.

DESCRIPTION OF A PREFERRED EMBODIMENT

The embodiment illustrated in the figure shows a primary switch-mode power supply unit having three electrically isolated secondary circuits 2, 4 and 6 of which secondary circuit 2 generates a controlled output voltage $U_{A1}$. As a result of the magnetic mutual coupling, secondary circuits 4 and 6 generate in-phase output voltages $U_{A2}$ and $U_{A3}$. Each of these secondary circuits 4 and 6 consists of a secondary winding 8, a diode rectifier 10 and a filter capacitor 12. In secondary circuit 2, likewise, the secondary winding 14 is connected in an electrically parallel manner to a series circuit consisting of a diode rectifier 16 and a filter capacitor 18. The output terminal 20 of the secondary circuit 2 is connected to the junction point 24 of the filter capacitor 18 and the diode rectifier 16 by means of a fuse protection device. The output terminal 20 is also connected to an actual-value sensor 26 which is connected to the input of a regulator 28. A voltage divider is provided as the measurement value network 26 and an operational amplifier with inverting and non-inverting inputs is provided as the regulator 28. The inverting input of the regulator 28 is connected to the output terminal 30 of the actual-value sensor 26. Between the junction point 24 of the filter capacitor 18 and the fuse 22 and the output terminal 30 of the actual-value sensor 26, a transistor is placed as a switch 32 in such a manner that the base 34 is connected by means of a base resistor 36, to the output terminal 20 of the secondary circuit 2; the emitter 38 is connected to the junction point 24 and the collector 40 is connected to the output terminal 30 of the actual-value sensor 26. The non-inverting input of the regulator 28 is connected to a reference voltage $U_R$. The output 42 of the regulator 28 acts upon the primary switching device 44. This line of action is shown in the figure by dashed line 46.

In the steady-state operating condition, the output voltage $U_{A1}$ of the secondary circuit 2 should be, for example, 5 volts. The in-phase output voltages $U_{A2}$ and $U_{A3}$ should be 12 volts and 15 volts respectively. In this operating condition, the transistor switch 32 is open, i.e., the pnp transistor provided is in the cut-off state. The resistance ratio of the actual-value sensor 26 is, for example, 1:1; that is, the voltage $U_{AJ}$ at the output 30 of the actual-value sensor 26 is 2.5 volts. In order for the voltage $U_{A1}$ to be stabilized at 5 volts, the reference voltage $U_R$ must be equal to 2.5 volts. An over-voltage is caused by a short-circuit at the output 20 of the secondary circuit 2 tripping the fuse 22; as a result, a potential difference appears between the output terminal 20 and the junction point 24, or between the base 34 and the emitter 38 of the pnp transistor switch 32. Thus, the switch 32 closes and connects the output terminal 30 of the actual-value sensor 26 to the junction point 24. When this connection is made, the voltage $U_{AJ}$ at the output 30 of the measurement value network 26 increases to the value of the filter capacitor voltage $U_{GK}$, which is higher than the value of reference voltage. This increase in voltage is opposed by the regulator 28 in such a manner that the duty cycle of the primary switching device 44 is lowered. At the same time, the filter capacitor voltage $U_{GK}$ decreases in accordance with a predetermined time constant.

As soon as the voltage $U_{AJ}$ at the output 30 of the actual-value sensor 26 falls below the reference value $U_R$, the regulator 28 raises the duty cycle of the primary switching device 44 again. In the steady state condition in follow-up operation with a tripped fuse 22, a voltage having a value of 2.5 volts appears; i.e., the output voltage of the secondary circuit during fault operation is half as high as the regulated output voltage $U_{A1}$ of the secondary circuit 2. Thus, the in-phase output voltages $U_{A2}$ and $U_{A3}$ are also halved as a result of the magnetic mutual coupling and the altered duty cycle of the primary switching device 44.

In this way, with simple means an over-voltage protection is obtained for a primary switched-mode power supply unit with several electrically-isolated secondary circuits 2, 4 and 6, without additional monitoring of an in-phase output voltage, either $U_{A2}$ or $U_{A3}$. Furthermore, in case of a fault, a stable operating point occurs which lies below the regulated operating point; the stable operating point in case of a fault, is predetermined by the resistance ratio of the actual-value sensor 26. Moreover, the values of the in-phase output voltages $U_{A2}$ and $U_{A3}$ are determined by the resistance ratio of the actual-value sensor 26 in the event of a fault.

It will now be understood that there has been disclosed an improved system for protecting the outputs of a multiple mutually coupled secondary power supply in the event that one of the secondaries is short-circuited and a complete disconnection with its attendant rise in voltage of the other secondaries because of undesired regulation. As will be evident from the foregoing description, certain aspects of the invention are not limited to particular details of the examples illustrated and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. A primary switched-mode power supply unit with a plurality of electrically isolated secondary circuits, each of said secondary circuits having a secondary winding connected to a respective series circuit of a rectifier and a filter capacitor, one of said series circuits having a fuse connected between the connection point of said rectifier and said filter capacitor and an output of the respective-secondary circuit, said output is connected to an actual-value sensor, and said actual-value sensor is connected to a controller, comprising: a switch connected from the connection point of the filter capacitor and the fuse to an output terminal of the actual-value sensor.

2. A primary switched-mode power supply unit according to claim 1, wherein the actual-value sensor is a voltage divider.

3. A primary switched-mode power supply unit according to claim 2, wherein the switch is a transistor.

4. A primary switched-mode power supply unit according to claim 3, wherein the transistor is a bipolar transistor having a base connected to an output voltage terminal; an emitter connected to the connection point of the filter capacitor and the fuse device; and a collector connected to the actual-value sensor output terminal.

* * * * *